(12) United States Patent
Fujimoto et al.

(10) Patent No.: US 11,673,540 B2
(45) Date of Patent: Jun. 13, 2023

(54) VEHICLE BRAKING DEVICE

(71) Applicant: TOYOTA JIDOSHA KABUSHIKI KAISHA, Toyota (JP)

(72) Inventors: Tetsuya Fujimoto, Toyota (JP); Ikuru Konno, Toyoake (JP); Takenori Kubo, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 155 days.

(21) Appl. No.: 16/832,879

(22) Filed: Mar. 27, 2020

(65) Prior Publication Data

US 2020/0317176 A1 Oct. 8, 2020

(30) Foreign Application Priority Data

Apr. 3, 2019 (JP) .............................. JP2019-071274

(51) Int. Cl.
*B60T 8/40* (2006.01)
*B60T 7/04* (2006.01)

(52) U.S. Cl.
CPC .............. *B60T 8/4018* (2013.01); *B60T 7/04* (2013.01); *B60T 8/404* (2013.01); *B60T 8/4036* (2013.01); *B60T 2270/402* (2013.01)

(58) Field of Classification Search
CPC ..... B60T 7/04; B60T 7/06; B60T 7/08; B60T 7/042; B60T 7/065; B60T 8/404; B60T 8/3685; B60T 8/4018; B60T 8/4031; B60T 8/4036; B60T 11/16; B60T 13/14; B60T 13/26; B60T 13/74; B60T 13/142;

(Continued)

(56) References Cited

U.S. PATENT DOCUMENTS 2,844,940 A * 7/1958 Huber ................... B60T 11/224
 92/135
4,819,996 A * 4/1989 Belart ..................... B60T 8/449
 60/554

(Continued)

FOREIGN PATENT DOCUMENTS

CN 102753411 A 10/2012
CN 107406060 A 11/2017

(Continued)

OTHER PUBLICATIONS

"The LAVIS Project", Coach Tours UK, retrieved from URL: www.coachtoursuk.com/lavis-project/, Apr. 2018, (3 pages total).

*Primary Examiner* — Nicholas J Lane
*Assistant Examiner* — San M Aung
(74) *Attorney, Agent, or Firm* — Sughrue Mion, PLLC

(57) ABSTRACT

A vehicle braking device includes: a brake fluid pressure generation device arranged in a storage chamber separated from a vehicle cabin; and a brake operation part mechanically connected to the brake fluid pressure generation device, the brake operation part being not provided in the vehicle cabin. The brake fluid pressure generation device includes a cylinder and pistons configured to slide inside the cylinder. The brake fluid pressure generation device is configured to generate brake fluid pressure in accordance with strokes of the pistons. The brake fluid pressure generation device is arranged such that a sliding direction of the pistons is along a direction different from the vehicle front-rear direction in a plan view.

14 Claims, 10 Drawing Sheets

(58) Field of Classification Search
CPC .... B60T 13/148; B60T 13/662; B60T 13/683;
B60T 13/686; B60T 13/745; B60T 17/02;
B60T 2270/402; B60W 60/001
USPC .......................................................... 303/10
See application file for complete search history.

(56) References Cited

U.S. PATENT DOCUMENTS

| | | | | |
|---|---|---|---|---|
| 5,186,004 | A * | 2/1993 | Gautier | B60T 13/565 92/140 |
| 5,188,431 | A * | 2/1993 | Gautier | B60T 13/52 303/114.2 |
| 5,289,682 | A * | 3/1994 | Gill | B60T 13/565 60/581 |
| 5,329,769 | A * | 7/1994 | Wilson | B60T 11/232 60/549 |
| 5,590,937 | A * | 1/1997 | Heibel | B60T 8/3275 303/3 |
| 10,583,818 | B2 * | 3/2020 | Chang | B60T 13/662 |
| 2002/0189909 | A1 * | 12/2002 | Buckley | B60T 11/103 188/73.31 |
| 2004/0113488 | A1 * | 6/2004 | Sekihara | B60T 8/368 303/119.3 |
| 2013/0291533 | A1 * | 11/2013 | Inoue | F15B 15/00 60/545 |
| 2015/0066326 | A1 * | 3/2015 | Furuyama | B60T 13/146 303/10 |
| 2017/0232849 | A1 | 8/2017 | Yamamoto et al. | |
| 2018/0065611 | A1 | 3/2018 | Matsuura | |

FOREIGN PATENT DOCUMENTS

| | | | | |
|---|---|---|---|---|
| CN | 110406518 | A * | 11/2019 | |
| CN | 110406518 | A * | 11/2019 | ................ B60L 7/10 |
| DE | 102016222553 | A1 * | 5/2018 | |
| DE | 102016222553 | A1 * | 5/2018 | ................ B60T 8/26 |
| EP | 1174320 | A2 * | 6/2001 | ............ B60T 111/10 |
| EP | 1174320 | A2 * | 1/2002 | ............. B60T 11/10 |
| JP | 2008143492 | A * | 6/2008 | |
| JP | 2008265728 | A * | 11/2008 | ............ B60T 13/586 |
| JP | 4639118 | B2 | 2/2011 | |
| JP | 2012-106643 | A | 6/2012 | |
| JP | 2012-106647 | A | 6/2012 | |
| JP | 2015098289 | A * | 5/2015 | ............. B60T 11/18 |
| KR | 1020170096588 | A | 8/2017 | |
| KR | 1020170132723 | A | 12/2017 | |
| WO | 2011/096938 | A1 | 8/2011 | |

\* cited by examiner

VEHICLE BRAKING DEVICE

INCORPORATION BY REFERENCE

The disclosure of Japanese Patent Application No. 2019-071274 filed on Apr. 3, 2019 including the specification, drawings and abstract is incorporated herein by reference in its entirety.

BACKGROUND

1. Technical Field

The present disclosure relates to a vehicle braking device including a brake fluid pressure generation device arranged in a storage chamber separated from a vehicle cabin. The present disclosure particularly relates to a vehicle braking device provided in a vehicle configured such that a brake operation part mechanically connected to a brake fluid pressure generation device is not provided in a vehicle cabin.

2. Description of Related Art

In the related art, there has been known an electric braking device configured to electrically control brake fluid pressure such that a brake for a vehicle is actuated without depending on stepping force applied by a driver.

For example, Japanese Patent No. 4639118 (JP 4639118 B) describes a vehicle brake fluid pressure control device that achieves an excellent operation feeling by creating an operation feeling of a brake pedal by a feeling creation electric motor connected to the brake pedal.

Note that, in the device described in JP 4639118 B, if a system abnormality occurs by any chance, a master cylinder can be directly actuated by stepping on the brake pedal by a driver.

SUMMARY

In the meantime, in recent years, research and development have been made in terms of a vehicle configured such that an operation part mechanically connected to a device arranged in a storage chamber is not provided in a vehicle cabin. However, in the research and development, in terms of the arrangement of devices and so on arranged in the storage chamber, the layout of a conventional vehicle is often employed.

For example, a braking device is often configured such that a master cylinder is arranged so as to extend in the vehicle front-rear direction in an engine compartment or the like, though the braking device does not necessarily require stepping force applied by a driver and is electrically controllable similarly to the device in JP 4639118 B.

However, in a vehicle configured such that a brake operation part mechanically connected to a brake fluid pressure generation device is not provided in a vehicle cabin, in a case where a space for the vehicle cabin as a space to be used by an occupant is desired to be increased, for example, such a layout is not optimum. In view of this, there is room for consideration.

The present disclosure relates to a braking device provided in a vehicle configured such that a brake operation part mechanically connected to a brake fluid pressure generation device arranged in a storage chamber is not provided in a vehicle cabin, and the present disclosure provides a vehicle braking device suitable to increase a space for the vehicle cabin.

A vehicle braking device according to a first aspect of the present disclosure is a vehicle braking device including a brake fluid pressure generation device and a brake operation part. The brake fluid pressure generation device is arranged in a storage chamber separated from a vehicle cabin. The brake operation part is mechanically connected to the brake fluid pressure generation device, and the brake operation part is not provided in the vehicle cabin. The brake fluid pressure generation device includes a cylinder and pistons configured to slide inside the cylinder. The brake fluid pressure generation device is configured to generate brake fluid pressure in accordance with strokes of the pistons. The brake fluid pressure generation device is arranged such that a sliding direction of the pistons is along a direction different from the vehicle front-rear direction in a plan view.

With the above configuration, the brake fluid pressure generation device can be arranged in accordance with a positional relationship with other devices, frame members, and so on arranged in the storage chamber, in other words, in accordance with an arrangement space in the storage chamber. Accordingly, the storage chamber can be reduced in size, so that a space for the vehicle cabin can be increased.

Further, in the above aspect, the brake fluid pressure generation device may be arranged such that an angle formed between the sliding direction of the pistons and a vehicle width direction is smaller than an angle formed between the sliding direction of the pistons and the vehicle front-rear direction in a plan view.

In the storage chamber, many devices and members such as an axle and crossmembers are arranged so as to extend in the vehicle width direction. In terms of this, in this configuration, a difference between a longitudinal direction of the brake fluid pressure generation device and an extending direction of those many devices and members is small. Accordingly, the storage chamber can be reduced in size, so that the space for the vehicle cabin can be further increased.

Further, in the above aspect, the brake fluid pressure generation device may be arranged such that the sliding direction of the pistons is parallel to the vehicle width direction.

In the above configuration, the brake fluid pressure generation device is arranged such that the sliding direction of the pistons is parallel to the vehicle width direction, in other words, the longitudinal direction of the brake fluid pressure generation device is along the vehicle width direction. Accordingly, the axle, the crossmembers, and so on extending in the vehicle width direction can be arranged in parallel to the brake fluid pressure generation device in the storage chamber. Accordingly, for example, in comparison with a case where the brake fluid pressure generation device is arranged so as to extend in the vehicle front-rear direction, in other words, a case where many devices and members extending in the vehicle width direction are provided together with the brake fluid pressure generation device extending in the vehicle front-rear direction in the storage chamber, the storage chamber can be reduced in size, so that the space for the vehicle cabin can be still more increased.

Further, in the above aspect, the storage chamber may include a pushing member configured to cause the pistons to stroke by pushing the pistons.

With the above configuration, even in a case where the brake operation part mechanically connected to the brake fluid pressure generation device is not provided in the vehicle cabin, the pushing member in the storage chamber causes the pistons to stroke, so that brake fluid pressure can be surely generated.

Further, in the above aspect, the vehicle may be a vehicle in which automated driving is enabled.

In the present disclosure, the "automated driving" is a concept that includes not only fully-automated driving that does not need any operation by an occupant at all, but also semi-automated driving in which the occupant performs auxiliary operations.

With the above configuration, it is possible to increase the space for the vehicle cabin in the vehicle in which the automated driving is enabled.

Further, a vehicle braking device according to a second aspect of the present disclosure is a vehicle braking device including a brake fluid pressure generation device and a brake operation part. The brake fluid pressure generation device is arranged in a storage chamber separated from a vehicle cabin. The brake operation part is mechanically connected to the brake fluid pressure generation device, and the brake operation part is not provided in the vehicle cabin. The brake fluid pressure generation device includes a first brake fluid pressure generation device including a first fluid pressure source, and a second brake fluid pressure generation device including a second fluid pressure source. The first brake fluid pressure generation device and the second brake fluid pressure generation device are arranged so as to at least partially overlap each other in the vehicle front-rear direction when the first brake fluid pressure generation device and the second brake fluid pressure generation device are viewed from the vehicle width direction.

In the above configuration, the first brake fluid pressure generation device and the second brake fluid pressure generation device are arranged so as to at least partially overlap each other in the vehicle front-rear direction when the first brake fluid pressure generation device and the second brake fluid pressure generation device are viewed from the vehicle width direction. Accordingly, in comparison with a case where the first brake fluid pressure generation device and the second brake fluid pressure generation device are arranged so as to be separated from each other, the storage chamber can be reduced in size, so that a space for the vehicle cabin can be increased.

Further, in the above aspect, the first brake fluid pressure generation device may include at least one of a reserve tank and a brake electronic control unit.

Also, in the above aspect, the second brake fluid pressure generation device may include at least one of a reserve tank and a brake electronic control unit.

Further, in the above aspect, the vehicle may be a vehicle in which automated driving is enabled.

Furthermore, a vehicle braking device according to a third aspect of the present disclosure is a vehicle braking device including a brake fluid pressure generation device and a brake operation part. The brake fluid pressure generation device is arranged in a storage chamber separated from a vehicle cabin. The brake operation part is mechanically connected to the brake fluid pressure generation device, and the brake operation part is not provided in the vehicle cabin. The brake fluid pressure generation device includes a reserve tank, a fluid pressure source, and a brake electronic control unit. The reserve tank, the fluid pressure source, and the brake electronic control unit are arranged in an upper part of the storage chamber so as to at least partially overlap each other in the vehicle front-rear direction when the reserve tank, the fluid pressure source, and the brake electronic control unit are viewed from the vehicle width direction.

In the above configuration, the reserve tank, the fluid pressure source, and the brake ECU are arranged in the storage chamber so as to at least partially overlap each other in the vehicle front-rear direction when the reserve tank, the fluid pressure source, and the brake electronic control unit are viewed from the vehicle width direction. Accordingly, an axle, crossmembers, and so on extending in the vehicle width direction can be arranged generally in parallel to the brake fluid pressure generation device. Accordingly, the storage chamber can be reduced in size, so that a space for the vehicle cabin can be increased. Further, as the brake fluid pressure generation device is arranged in the upper part of the storage chamber, a space under the brake fluid pressure generation device can be used effectively.

Further, in the above aspect, the brake fluid pressure generation device may include a cylinder and pistons configured to slide inside the cylinder. The cylinder, the reserve tank, the fluid pressure source, and the brake electronic control unit may be arranged in the upper part of the storage chamber so as to at least partially overlap each other in the vehicle front-rear direction when the cylinder, the reserve tank, the fluid pressure source, and the brake electronic control unit are viewed from the vehicle width direction.

In the above configuration, the brake fluid pressure generation device is arranged such that its constituents at least partially overlap each other in the vehicle front-rear direction when the brake fluid pressure generation device is viewed from the vehicle width direction, in other words, the longitudinal direction of the brake fluid pressure generation device is along the vehicle width direction. Accordingly, the storage chamber can be reduced in size, so that the space for the vehicle cabin can be increased.

Further, in the above aspect, the vehicle may be a vehicle in which automated driving is enabled.

Further, a vehicle braking device according to a fourth aspect of the present disclosure is a vehicle braking device including a brake fluid pressure generation device and a brake operation part. The brake fluid pressure generation device is arranged in a storage chamber separated from a vehicle cabin. The brake operation part is mechanically connected to the brake fluid pressure generation device, and the brake operation part is not provided in the vehicle cabin. The brake fluid pressure generation device includes a first brake fluid pressure generation device including a first fluid pressure source, and a second brake fluid pressure generation device including a second fluid pressure source. The first brake fluid pressure generation device and the second brake fluid pressure generation device are arranged in an upper part of the storage chamber so as to be adjacent to each other in the same horizontal plane.

In the above configuration, the first and second brake fluid pressure generation devices are arranged in the storage chamber so as to be adjacent to each other in the same horizontal plane. Accordingly, in comparison with a case where the first and second brake fluid pressure generation devices are arranged so as to be separated from each other, the storage chamber can be reduced in size, so that a space for the vehicle cabin can be increased. Further, as the first and second brake fluid pressure generation devices are arranged in the upper part of the storage chamber, a space under the brake fluid pressure generation devices can be used effectively.

Further, in the above aspect, the vehicle may be a vehicle in which automated driving is enabled.

Also, in the above aspect, the brake operation part may be operated by a foot of an occupant.

In the above configuration, the brake operation part, e.g., a brake pedal, that is mechanically connected to the brake fluid pressure generation device and operated by a foot of an occupant is not provided in the vehicle cabin. Accordingly, the space for the vehicle cabin can be increased.

As described above, with the vehicle braking device according to the present disclosure, it is possible to increase the space for the vehicle cabin in the vehicle configured such that the brake operation part mechanically connected to the brake fluid pressure generation device arranged in the storage chamber is not provided in the vehicle cabin.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to the drawings, the following describes an embodiment to carry out the present disclosure.

Overall Configuration of Vehicle

Figure 1:
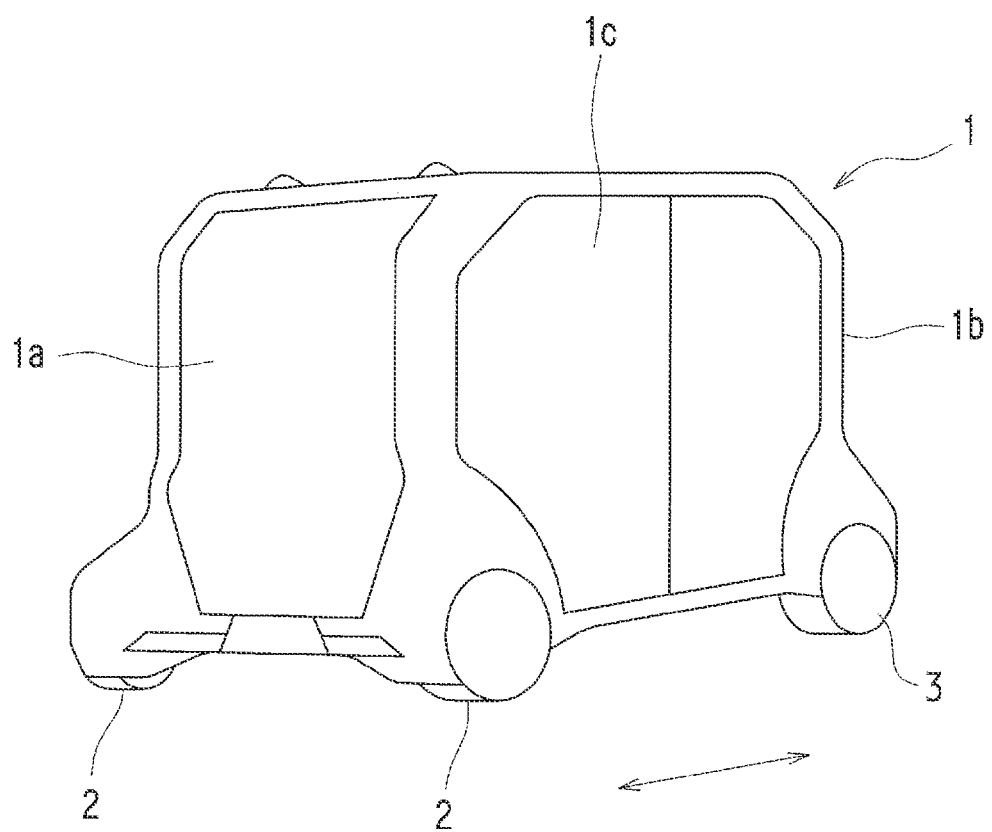
FIG. 1 is a perspective view schematically illustrating a vehicle according to an embodiment of the present disclosure.

FIG. 1 is a perspective view schematically illustrating a vehicle 1 according to the present embodiment. As illustrated in FIG. 1, the vehicle 1 has an external appearance that is greatly different from conventional general vehicles in that, for example, its vehicle body is almost symmetrical in an advancing direction (see an arrow in FIG. 1), wheels 2, 3 are arranged extremely close to both ends of the vehicle, respectively, there is no hood or the like covering an engine compartment (a motor room), and an almost entire surface of a vehicle side face 1c is configured as a doorway.

Note that, since the vehicle 1 can advance to both sides in the advancing direction in generally the same mode, there is no concept of a front side and a rear side in the vehicle 1. However, for convenience, the left side in FIG. 1 is described as a front end portion 1a (reference numerals 2 indicate front wheels), and the right side in FIG. 1 is described as a rear end portion 1b (reference numerals 3 indicate rear wheels). Further, in each of the drawings, an arrow Fr indicates the front side in the vehicle front-rear direction, an arrow Rh indicates the right side in the vehicle width direction, and an arrow Up indicates the upper side.

Figure 2:
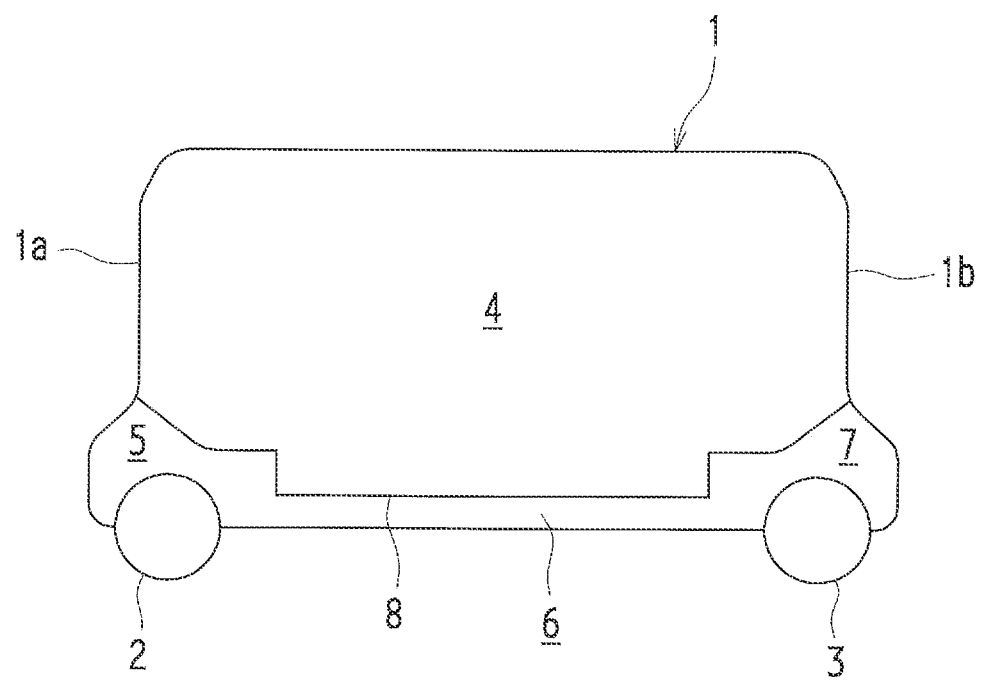
FIG. 2 is a vertical sectional view schematically illustrating the inside of the vehicle.

FIG. 2 is a vertical sectional view schematically illustrating the inside of the vehicle 1. Note that, in FIG. 2, seats and so on are not illustrated. The vehicle 1 is a vehicle in which so-called "automated driving" is enabled, and because of this, not only the external appearance but also the inside of the vehicle is greatly different from conventional general vehicles as illustrated in FIG. 2. Note that the "automated driving" is a concept that includes not only fully-automated driving that does not need any operation by an occupant at all, but also semi-automated driving in which the occupant performs auxiliary operations.

For example, the vehicle 1 performs automated driving such that an ECU 50 (see FIG. 4) actuates an electric drive motor 51 (see FIG. 3), a steering actuator (not shown), a brake actuator 20 (see FIG. 3), and so on based on information from a camera, a sensor, a radar, a GPS antenna, and so on (not shown), commands transmitted from an external server through a network, and so on.

Therefore, in the vehicle 1, the presence of a so-called "driver" is not essential. As illustrated in FIG. 2, an operation part such as a steering wheel and a brake pedal to be operated by the driver is not permanently provided in a vehicle cabin 4. Because of this, a proportion of the vehicle cabin 4 in the entire vehicle 1 is very large. Note that the state where "the operation part is not permanently provided in the vehicle cabin 4" includes a case where the operation part is not provided at all in the vehicle 1 itself and also includes a case where the operation part that is normally hidden in storage chambers 5, 7 or an underfloor space 6 appears in the vehicle cabin 4 as a result of a button operation and so on, for example, when an unexpected situation occurs.

As a matter of course, the vehicle 1 is configured to perform the fully-automated driving by the ECU 50 and so on and also perform the semi-automated driving in which an auxiliary operation is performed by an operator as a monitoring person who is in the vehicle cabin 4. For example, a system of the vehicle 1 is configured such that the operator monitors situations around the vehicle 1 when a periphery image captured by the camera is projected on a tablet PC (not shown) owned by the operator, and the operator actuates an emergency stop brake or the like by pressing a button icon on an image on the tablet PC.

Note that the presence of the operator in the vehicle cabin 4 is also not essential, and for example, an operator and so on in an external management center may play a role of the operator inside the vehicle cabin 4, or an external server may play a similar role.

Further, in the vehicle 1, the front-side and rear-side storage chambers 5, 7 are provided in the front end portion 1a and the rear end portion 1b of the vehicle 1, respectively, so as to partially overlap the vehicle cabin 4 in the vehicle front-rear direction as illustrated in FIG. 2. In the front-side and rear-side storage chambers 5, 7, driving system apparatuses and electric system apparatuses such as the ECU 50, the electric drive motor 51, the steering actuator, and the brake actuator 20 are stored. More specifically, the front-side and rear-side storage chambers 5, 7 are separated from the vehicle cabin 4 by frame members such as side rails 65 (see FIG. 9) and a crossmember 63 (see FIG. 9) to be described later, and panel members of a cabin constituting the vehicle cabin 4 (hereinafter also referred to as frame members or the like 8). Thus, in the vehicle 1, spaces above the front-side and rear-side storage chambers 5, 7 can be used as the vehicle cabin 4.

As such, by elaborating configurations, structures, and arrangement of various pieces of onboard equipment, the vehicle 1 of the present embodiment that is greatly different from conventional general vehicles is achieved as a vehicle in which the proportion of the vehicle cabin 4 in the entire vehicle 1 is very large (proportions of the front-side and rear-side storage chambers 5, 7 and so on where the onboard equipment is stored are very low), as described above. The following describes details of a functional configuration, a structure, arrangement, and so on of a braking device 10 as a part of factors that achieve such a relatively wide vehicle cabin 4.

Braking Device

Arrangement of Braking Device

Figure 3:
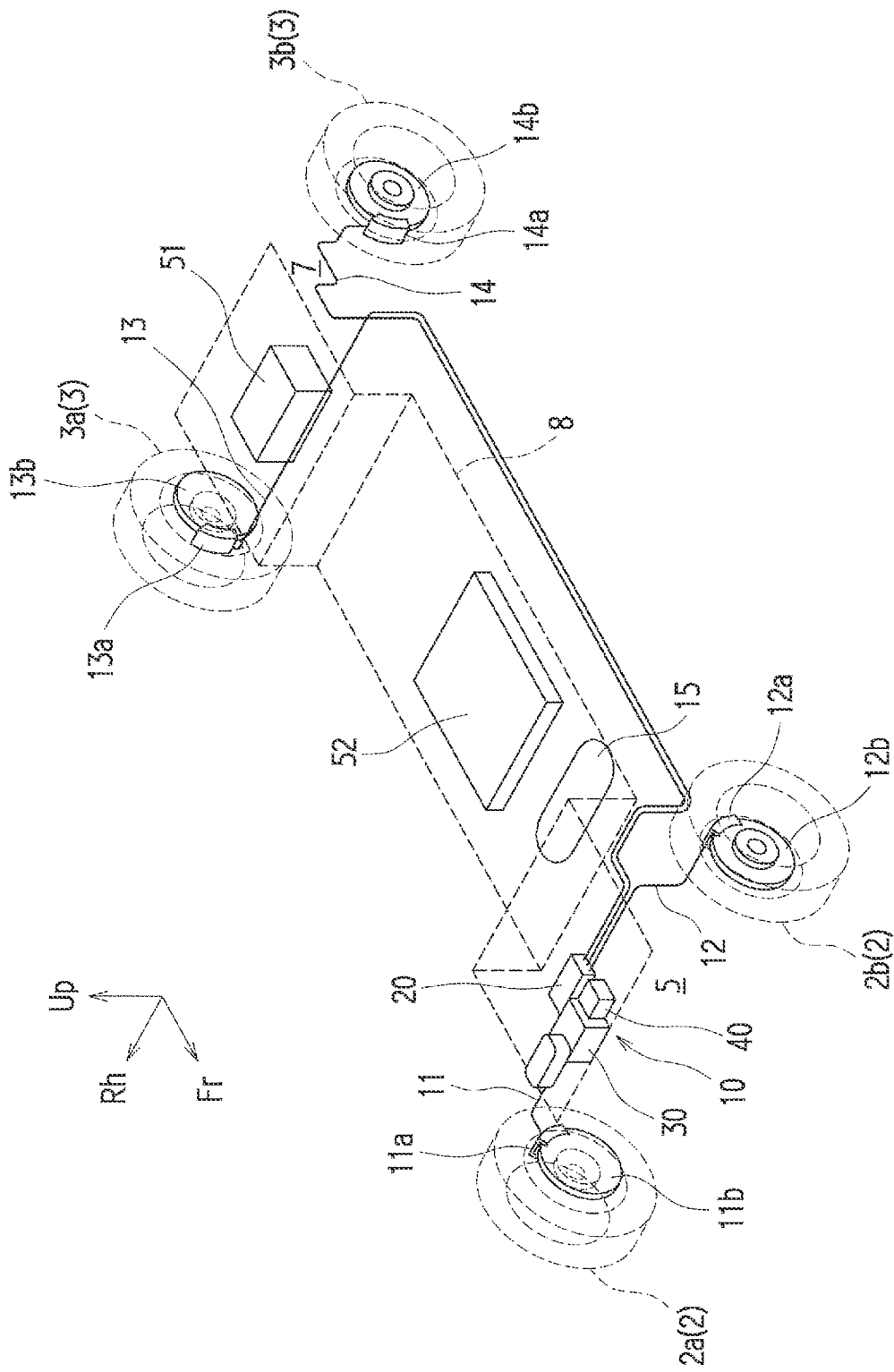
FIG. 3 is a perspective view schematically illustrating a braking device.

FIG. 3 is a perspective view schematically illustrating the braking device 10. As illustrated in FIG. 3, the braking device 10 includes a brake actuator 20, a brake unit 30, a brake pedal unit 40, an air tank 15, first to fourth brake pipes 11, 12, 13, 14, first to fourth brake calipers 11a, 12a, 13a, 14a, and first to fourth brake discs 11b, 12b, 13b, 14b.

In the braking device 10, the brake actuator 20, the brake unit 30, and the brake pedal unit 40 each functioning as a brake fluid pressure generation device configured to generate brake fluid pressure are arranged inside the front-side storage chamber 5. Note that the electric drive motor 51 as a driving source of the vehicle 1 is arranged inside the rear-side storage chamber 7 provided on the opposite side from the brake actuator 20, the brake unit 30, and the brake pedal unit 40.

The brake actuator 20 and the brake unit 30 are electrically actuated devices configured to generate brake fluid pressure in electric motors 26, 36 (see FIG. 5) and are configured to be actuated by use of a battery 52 as a power source, the battery 52 being arranged in the underfloor space 6 in the central part of the vehicle 1. In the meantime, the brake pedal unit 40 is a pneumatically actuated device and is configured to be actuated by compressed air filled in the air tank 15 arranged in the underfloor space 6.

The first brake caliper 11a and the first brake disc 11b are provided in a right front wheel 2a. The first brake caliper 11a is connected to a first port 23a (see FIG. 4) of the brake actuator 20 via the first brake pipe 11 extending to the right side in the vehicle width direction inside the front-side storage chamber 5. Further, the second brake caliper 12a and the second brake disc 12b are provided in a left front wheel 2b. The second brake caliper 12a is connected to a second port 23b (see FIG. 4) of the brake actuator 20 via the second brake pipe 12 extending to the left side in the vehicle width direction inside the front-side storage chamber 5.

The third brake caliper 13a and the third brake disc 13b are provided in a right rear wheel 3a. The third brake caliper 13a is connected to a third port 24a (see FIG. 4) of the brake actuator 20 via the third brake pipe 13. The third brake pipe 13 first extends to the left side in the vehicle width direction inside the front-side storage chamber 5 and then extends rearward in the vehicle front-rear direction inside the underfloor space 6 so as to reach the rear-side storage chamber 7. Then, the third brake pipe 13 extends to the right side in the vehicle width direction inside the rear-side storage chamber 7. Further, the fourth brake caliper 14a and the fourth brake disc 14b are provided in a left rear wheel 3b. The fourth brake caliper 14a is connected to a fourth port 24b (see FIG. 4) of the brake actuator 20 via the fourth brake pipe 14. The fourth brake pipe 14 is configured such that, after the fourth brake pipe 14 reaches the rear-side storage chamber 7 similarly to the third brake pipe 13, the fourth brake pipe 14 extends to the left side in the vehicle width direction inside the rear-side storage chamber 7.

Brake Fluid Pressure Transmission Route

Figure 4:
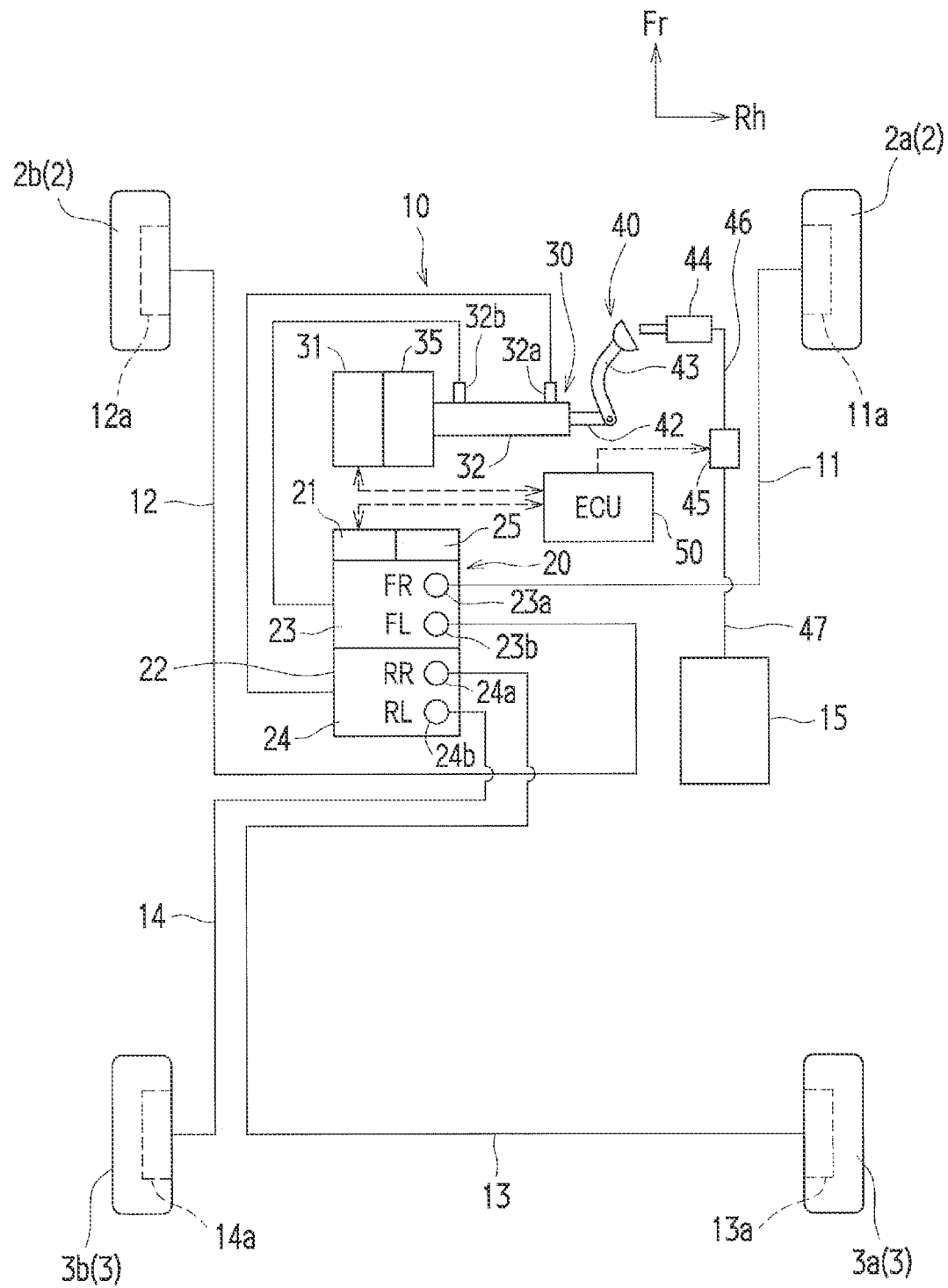
FIG. 4 is a view to schematically describe a brake fluid pressure transmission route.

FIG. 4 is a view to schematically describe the brake fluid pressure transmission route. As illustrated in FIG. 4, in the brake fluid pressure transmission route, the brake unit 30 and the brake pedal unit 40 are placed on the most upstream side, and the brake actuator 20 is placed on the downstream side from the brake unit 30 and the brake pedal unit 40, so that brake fluid pressure is supplied from the brake actuator 20 to the first to fourth brake calipers 11a, 12a, 13a, 14a.

The brake actuator 20 functions as a generation source of brake fluid pressure in the braking device 10. The brake actuator 20 includes a brake electronic control unit (ECU) 21, an actuator body portion 22, a reservoir tank 25, and the electric motor 26. The brake ECU 21 is connected to the ECU 50 via a communication line. The brake ECU 21 is configured to actuate the electric motor 26 based on a braking force request calculated by the ECU 50 based on information (a vehicle speed, a distance to a stop line or an obstacle, and so on) from the sensor, the camera, and so on so that the electric motor 26 pumps up hydraulic fluid from the reservoir tank 25 and pressurizes the hydraulic fluid. That is, the brake actuator 20 is configured to generate brake fluid pressure as much as necessary (to an extent requested by the ECU 50) when necessary (when the ECU 50 makes a request).

The actuator body portion 22 is divided into a first fluid chamber 23 and a second fluid chamber 24. The first and second ports 23a, 23b are provided in the first fluid chamber 23, and the hydraulic fluid pressurized by the electric motor 26 based on a command from the brake ECU 21 is supplied from the first and second ports 23a, 23b to the first and second brake calipers 11a, 12a, respectively. In the meantime, the third and fourth ports 24a, 24b are provided in the second fluid chamber 24, and the hydraulic fluid pressurized by the electric motor 26 based on the command from the brake ECU 21 is supplied from the third and fourth ports 24a, 24b to the third and fourth brake calipers 13a, 14a, respectively.

Since the actuator body portion 22 is divided into two fluid chambers as such, even if one of the fluid chambers is broken or the like, it is possible to supply the brake fluid pressure to the front wheels 2 or the rear wheels 3 from the other one of the fluid chambers without losing the brake fluid pressure. Further, since the brake actuator 20 is placed on the downstream side from the brake unit 30, even when the brake unit 30 has a malfunction, it is possible to independently supply the brake fluid pressure to the first to fourth brake calipers 11a, 12a, 13a, 14a.

The brake unit 30 is an equivalent of a so-called master cylinder and includes a brake ECU 31, a cylinder housing 32, first and second pistons 33, 34 (see FIG. 5) sliding inside the cylinder housing 32, a reservoir tank 35, and the electric motor 36.

The brake unit 30 is configured to generate brake fluid pressure in accordance with strokes of the first and second pistons 33, 34. The electric motor 36 is configured to pressurize hydraulic fluid pumped up from the reservoir tank 35 and constantly maintain the hydraulic fluid at high pressure. The brake ECU 31 is connected to the ECU 50 via a communication line, and based on a braking force request calculated by the ECU 50, the brake ECU 31 opens a second electromagnetic valve 39 (see FIG. 5) so as to release the high-pressure hydraulic fluid so that the first and second pistons 33, 34 are slid inside the cylinder housing 32 by the high-pressure hydraulic fluid. The brake fluid pressure thus generated in accordance with the strokes of the first and second pistons 33, 34 is supplied from first and second ports 32a, 32b provided in the cylinder housing 32 to the first to fourth brake calipers 11a, 12a, 13a, 14a via the first and second fluid chambers 23, 24 of the brake actuator 20.

As such, the brake unit 30 generates the brake fluid pressure independently from the brake actuator 20. Accordingly, even in a case where an electric system of the brake actuator 20 has a malfunction, when at least either one of the first and second fluid chambers 23, 24 is not damaged, it is possible to supply the brake fluid pressure to the front wheels 2 or the rear wheels 3.

In the meantime, the brake pedal unit 40 functions as a generation source of brake fluid pressure mainly at the time when the brake actuator 20 and the brake unit 30 are inoperative. For example, the brake pedal unit 40 is configured to generate brake fluid pressure instead of the brake actuator 20 and the brake unit 30 when the vehicle 1 has power outage or the like.

The brake pedal unit 40 includes an input piston 41 (see FIG. 5) sliding inside the cylinder housing 32 of the brake unit 30, a brake pedal 43, a rod 42 connecting the input piston 41 to the brake pedal 43, an air cylinder 44, a solenoid BOX 45, a hose 46 connecting the air cylinder 44 to the solenoid BOX 45, and a hose 47 connecting the solenoid BOX 45 to the air tank 15. The air cylinder 44 is configured to rotate the brake pedal 43 when the air cylinder 44 is actuated by compressed air filled in the air tank 15 as a valve (not shown) inside the solenoid BOX 45 opens at the time when a given condition such as power outage of the vehicle 1 is satisfied. The brake pedal 43 is rotated by the air cylinder 44 so as to push the input piston 41 (see FIG. 5) toward a pressurizing side. Hereby, the first and second pistons 33, 34 of the brake unit 30 are caused to stroke and generate brake fluid pressure. In view of this, in terms of correspondence between the specification and claims, the brake pedal 43 is one example of a "pushing member configured to cause the pistons to stroke by pushing the pistons" in the present disclosure. Note that the brake pedal 43 is biased by a spring (not shown) to an opposite direction from a direction where the input piston 41 is pushed toward the pressurizing side, and when the valve inside the solenoid BOX 45 closes, the brake pedal 43 returns to its original position.

The brake fluid pressure thus generated in accordance with the strokes of the first and second pistons 33, 34 is supplied from the first and second ports 32a, 32b provided in the cylinder housing 32 to the first to fourth brake calipers 11a, 12a, 13a, 14a via the first and second fluid chambers 23, 24 of the brake actuator 20. That is, in the present embodiment, the cylinder housing 32 and the first and second pistons 33, 34 are used for both the brake unit 30 and the brake pedal unit 40.

As such, the brake pedal unit 40 generates the brake fluid pressure independently from the brake actuator 20 and the brake unit 30. Accordingly, even in a case where the electric systems of the brake actuator 20 and the brake unit 30 have malfunctions, for example, when the given condition is satisfied, it is possible to supply the brake fluid pressure to the front wheels 2 and the rear wheels 3.

As described above, in the present embodiment, (A) at normal time when the electric system does not have any malfunction or the like, the brake actuator 20 supplies the brake fluid pressure as a generation source of brake fluid pressure.

In the meantime, (B) at abnormal time when the electric system and so on have a malfunction, (B-1) in a case where the brake actuator 20 has a malfunction, the brake unit 30 supplies the brake fluid pressure, and (B-2) in a case where the brake actuator 20 and the brake unit 30 have malfunctions due to power outage or the like, the brake pedal unit 40 supplies the brake fluid pressure.

Note that the brake fluid pressure of the emergency stop brake operated by the operator may be generated by any of the brake actuator 20, the brake unit 30, and the brake pedal unit 40.

The first to fourth brake calipers 11a, 12a, 13a, 14a then actuate wheel cylinders (not shown) provided therein by the brake fluid pressure supplied from the first to fourth ports 23a, 23b, 24a, 24b. Hereby, respective brake pads (not shown) are pressed against the first to fourth brake discs 11b, 12b, 13b, 14b so as to generate frictional braking force, so that the vehicle 1 is decelerated or stopped.

Next will be briefly described an example of a device configuration in which only the brake actuator 20 is actuated in the case of (A), the brake unit 30 is actuated in the case of (B-1), and the brake pedal unit 40 is actuated in the case of (B-2).

Figure 5:
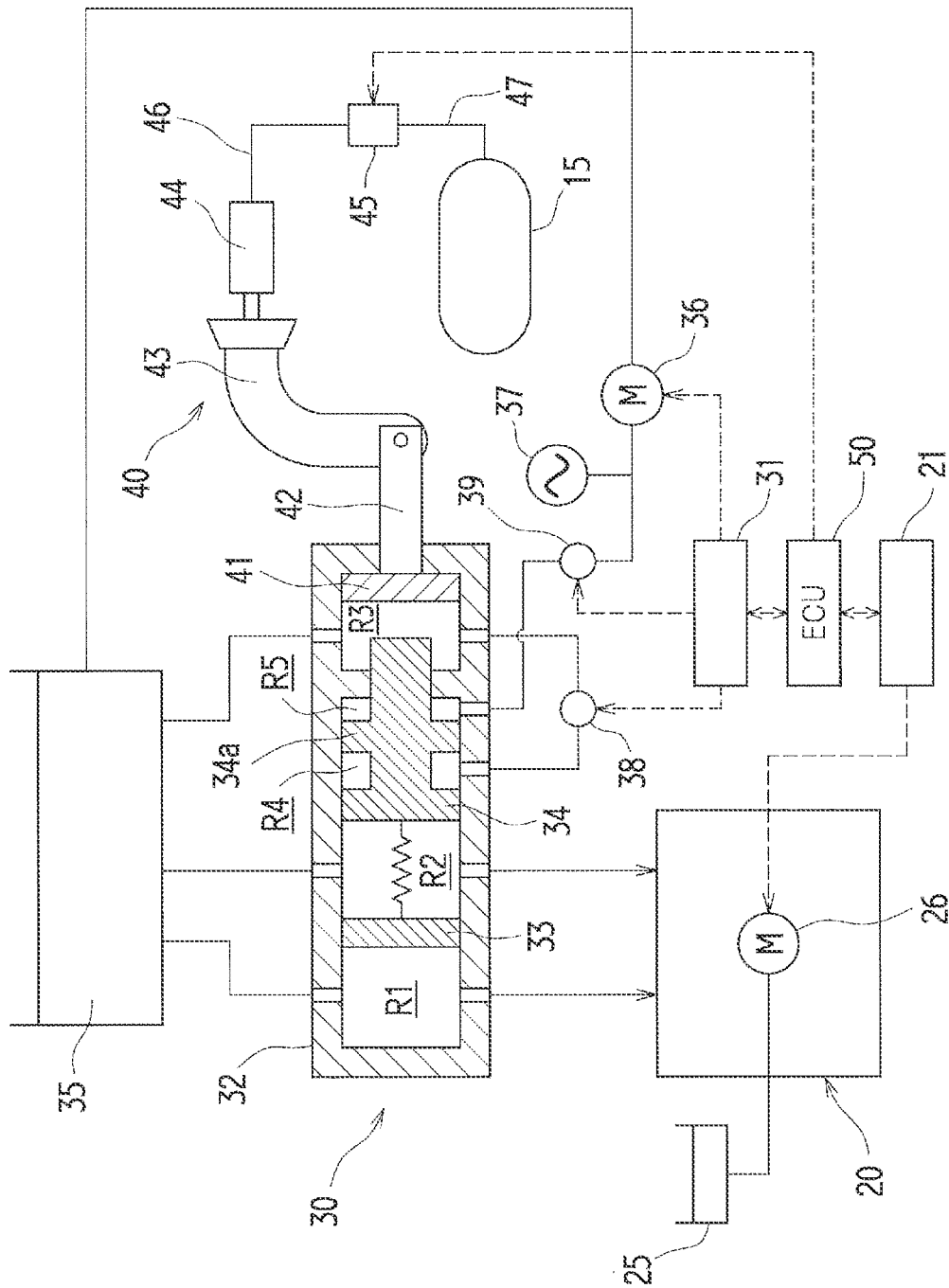
FIG. 5 is a view illustrating a schematic configuration of a brake fluid pressure generation device.

FIG. 5 is a view illustrating a schematic configuration of a generation source of brake fluid pressure. Note that FIG. 5 only illustrates an outline and does not illustrate precise configurations of the brake actuator 20, the brake unit 30, the brake pedal unit 40, and so on.

As illustrated in FIG. 5, the first piston 33, the second piston 34, and the input piston 41 are slidably housed inside the cylinder housing 32, and first to fifth fluid chambers R1, R2, R3, R4, R5 are separated from each other in the cylinder housing 32. The first fluid chamber R1 is connected to the reservoir tank 35 and the first fluid chamber 23 of the brake actuator 20, and the hydraulic fluid inside the first fluid chamber R1 is pressurized by the first piston 33. The second fluid chamber R2 is formed between the first piston 33 and the second piston 34 and is connected to the reservoir tank 35 and the second fluid chamber 24 of the brake actuator 20. The hydraulic fluid inside the second fluid chamber R2 is pressurized by the second piston 34. A rib portion 34a is provided in the second piston 34 such that the fourth fluid chamber R4 is provided on a first side of the rib portion 34a (a side close to the first and second fluid chambers R1, R2), and the fifth fluid chamber R5 is provided on a second side of the rib portion 34a (a side close to the third fluid chamber R3). The third fluid chamber R3 is connected to the reservoir tank 35 and the fourth fluid chamber R4, and the hydraulic fluid inside the third fluid chamber R3 is pressurized by the input piston 41. Note that the third fluid chamber R3 and the fourth fluid chamber R4 are connected to each other via a first electromagnetic valve 38 that opens in an energized state.

The brake ECU 31 of the brake unit 30 is configured to drive the electric motor 36 so that the electric motor 36 pumps up the hydraulic fluid from the reservoir tank 35 and pressurizes the hydraulic fluid. The hydraulic fluid is stored in an accumulator 37 in a pressurized state. The accumulator 37 is connected to the fifth fluid chamber R5 via the second electromagnetic valve 39 that opens in the energized state. Note that the brake ECU 31 is configured to maintain the first electromagnetic valve 38 in the energized state except when the brake ECU 31 actuates the brake pedal unit 40, and also maintain the second electromagnetic valve 39 in a non-energized state except when the brake ECU 31 actuates the brake unit 30.

The air cylinder 44 is connected to the air tank 15 via the solenoid BOX 45 configured such that the valve inside the solenoid BOX 45 closes in the energized state.

The ECU 50 is configured to maintain the solenoid BOX 45 in the energized state except when the ECU 50 actuates the brake pedal unit 40.

In the above configuration, in the case of (A), the brake ECU 31 closes the second electromagnetic valve 39 (the non-energized state), and the brake ECU 21 of the brake actuator 20 actuates the electric motor 26 so that the electric motor 26 pumps up the hydraulic fluid from the reservoir tank 25 and pressurizes the hydraulic fluid. Hereby, the vehicle 1 is decelerated or stopped by the brake fluid pressure from the brake actuator 20 only.

In the meantime, in the case of (B-1), the brake ECU 31 brings the second electromagnetic valve 39 into the energized state so that the second electromagnetic valve 39 opens, and the brake ECU 31 supplies the hydraulic fluid stored in the accumulator 37 in the pressurized state to the fifth fluid chamber R5. Here, since the first electromagnetic valve 38 is in the energized state (in a valve open state), fluid pressure in the third fluid chamber R3 and fluid pressure in the fourth fluid chamber R4 that faces the third fluid chamber R3 cancel each other, so that the second piston 34 operates only with fluid pressure in the fifth fluid chamber R5. Thus, in the case of (B-1), the vehicle 1 is decelerated or stopped by the brake fluid pressure from the brake unit 30 only.

In the meantime, in the case of (B-2), the first electromagnetic valve 38 closes and the valve inside the solenoid BOX 45 opens due to power outage, for example. As a result, the air cylinder 44 is actuated by the compressed air filled in the air tank 15 so as to rotate the brake pedal 43, thereby resulting in that the input piston 41 is pushed toward the pressurizing side, and the fluid pressure in the third fluid chamber R3 increases. Here, when the first electromagnetic valve 38 is closed, the fluid pressure in the third fluid chamber R3 does not cancel the fluid pressure in the fourth fluid chamber R4 that faces the third fluid chamber R3, so that the second piston 34 operates only with the fluid pressure in the third fluid chamber R3. Hereby, the vehicle 1 is decelerated or stopped by the brake fluid pressure from the brake pedal unit 40 only.

As described above, at normal time, the vehicle 1 of the present embodiment can be decelerated or stopped by the power of the battery 52, and when the vehicle 1 has power outage or the like, the vehicle 1 can be decelerated or stopped by the compressed air in the air tank 15 without a need of stepping force or the like applied by the driver. Accordingly, it is possible to employ the layout in which the brake pedal is not permanently provided in the vehicle cabin 4 as described above. That is, the vehicle 1 of the present embodiment is provided as a vehicle configured such that a brake operation part (a brake pedal or the like) mechanically connected to a brake fluid pressure generation device arranged in the front-side storage chamber 5 is not provided in the vehicle cabin 4.

Arrangement of Brake Fluid Pressure Generation Device

Next will be described the structure and arrangement of the brake actuator 20, the brake unit 30, and the brake pedal unit 40 in the front-side storage chamber 5.

Figure 6:
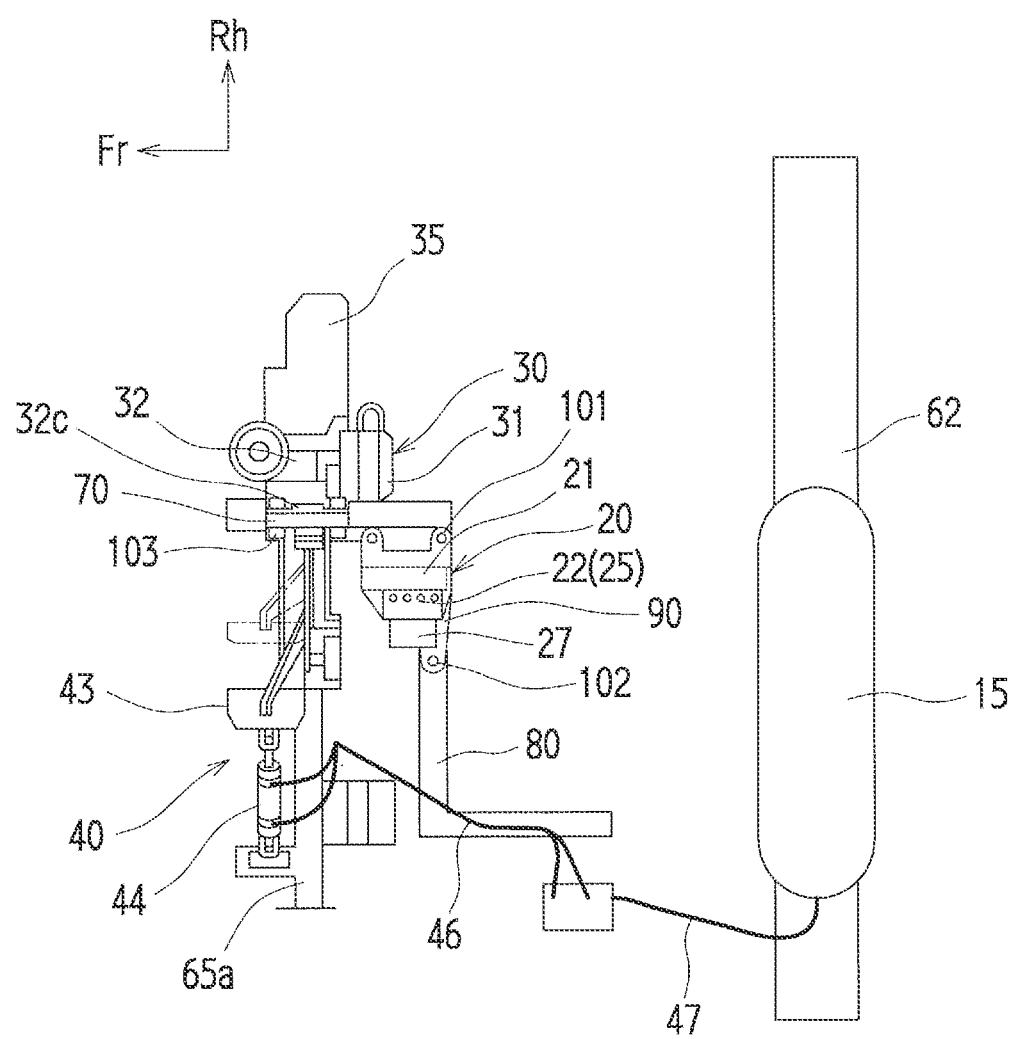
FIG. 6 is a plan view schematically illustrating the brake fluid pressure generation device.
Figure 7:
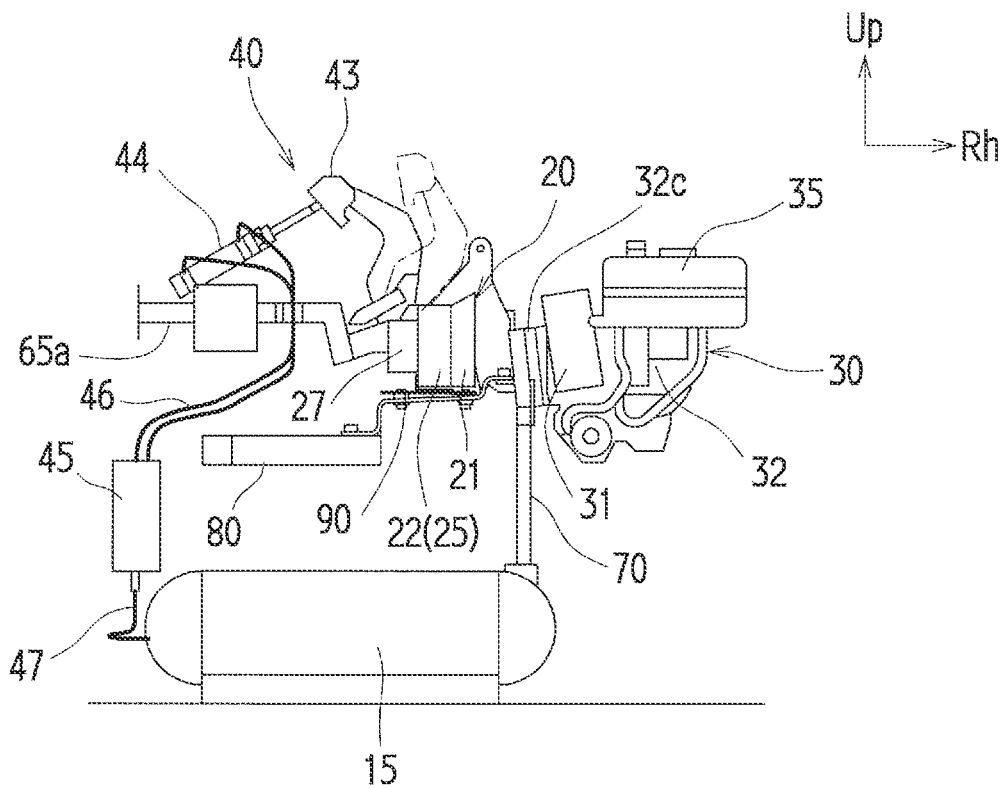
FIG. 7 is a back view schematically illustrating the brake fluid pressure generation device.
Figure 8:
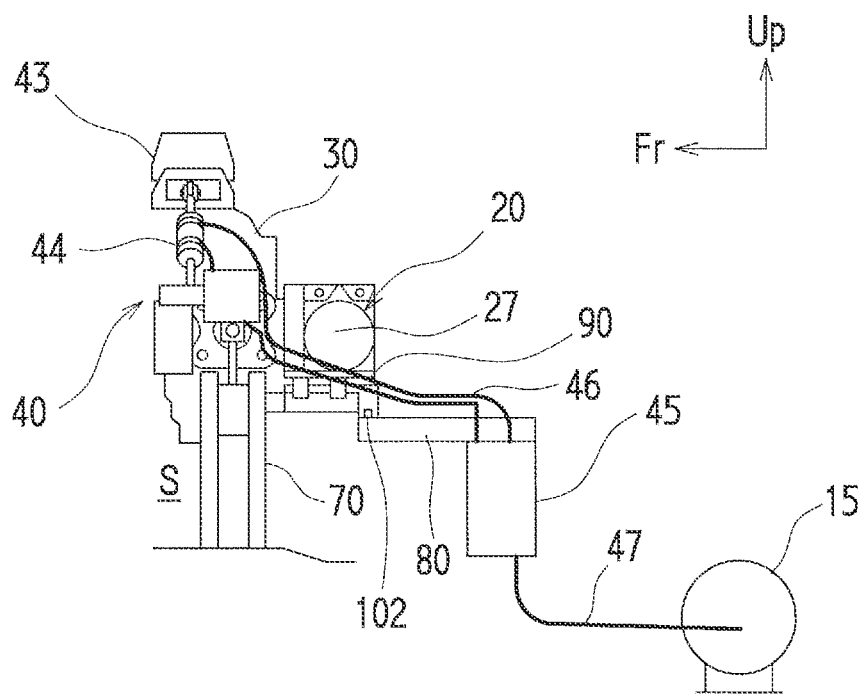
FIG. 8 is a side view schematically illustrating the brake fluid pressure generation device.
Figure 10:
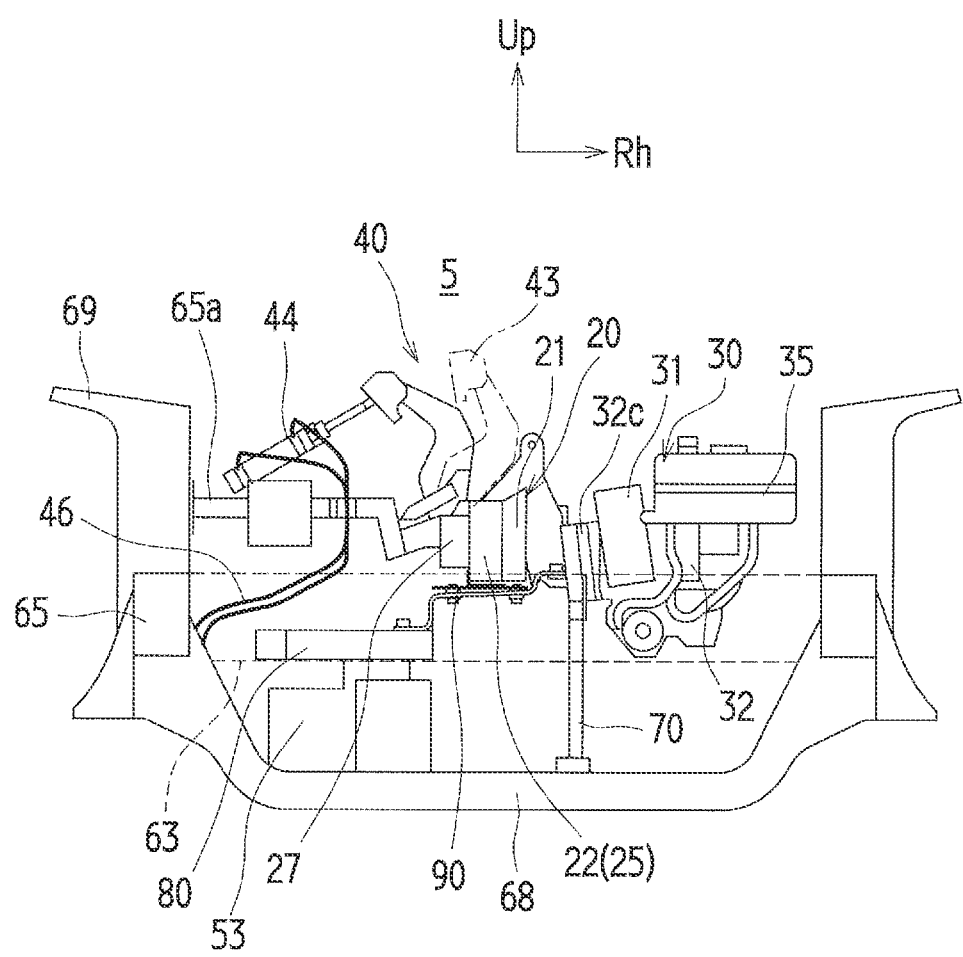
FIG. 10 is a back view schematically illustrating the brake fluid pressure generation device mounted on the vehicle.
Figure 11:
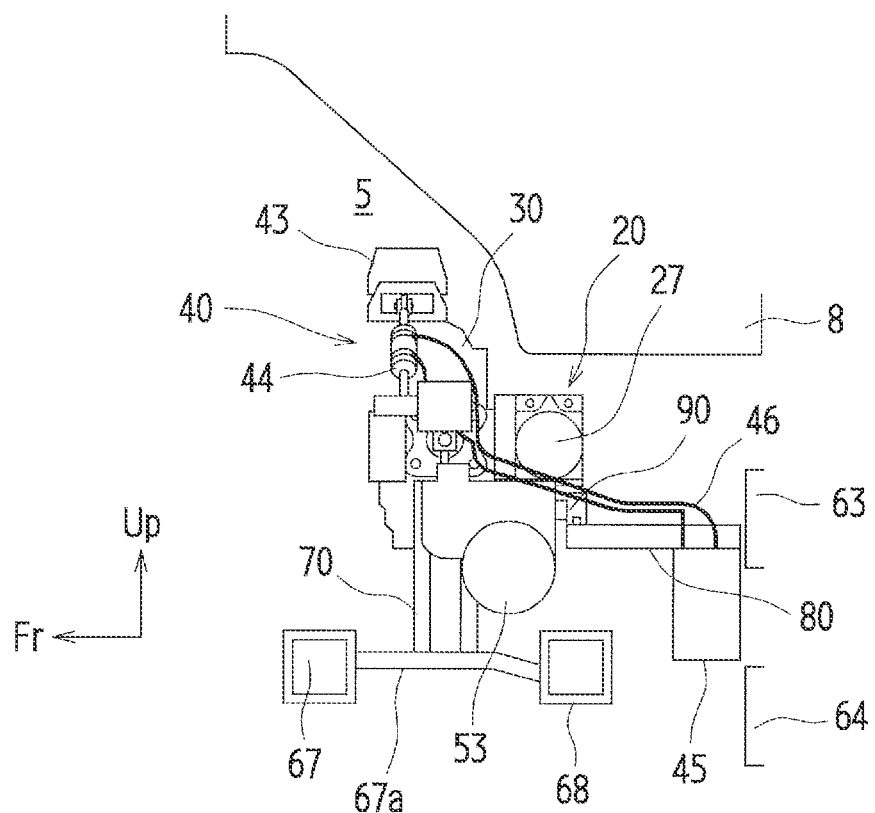
FIG. 11 is a side view schematically illustrating the brake fluid pressure generation device mounted on the vehicle.

FIGS. 6 to 8 are a plan view, a back view, and a side view each schematically illustrating the brake fluid pressure generation devices 20, 30, 40. Further, FIGS. 9 to 11 are a plan view, a back view, and a side view each schematically illustrating the brake fluid pressure generation devices 20, 30, 40 mounted on the vehicle.

First briefly described is the front-side storage chamber 5. As illustrated in FIG. 9, a pair of right and left side rails 61 is provided in a location corresponding to the underfloor space 6 in FIG. 2 such that the right and left side rails 61 are placed at both end portions of the underfloor space 6 in the vehicle width direction and extend in the vehicle front-rear direction. The side rails 61 are connected to each other via a crossmember 62 extending in the vehicle width direction. Front end portions of the side rails 61 are connected to a lower crossmember 64 out of two crossmembers 63, 64 arranged in the up-down direction as illustrated in FIG. 11. The front-side storage chamber 5 is provided in front of the crossmembers 63, 64 in the vehicle front-rear direction.

Figure 9:
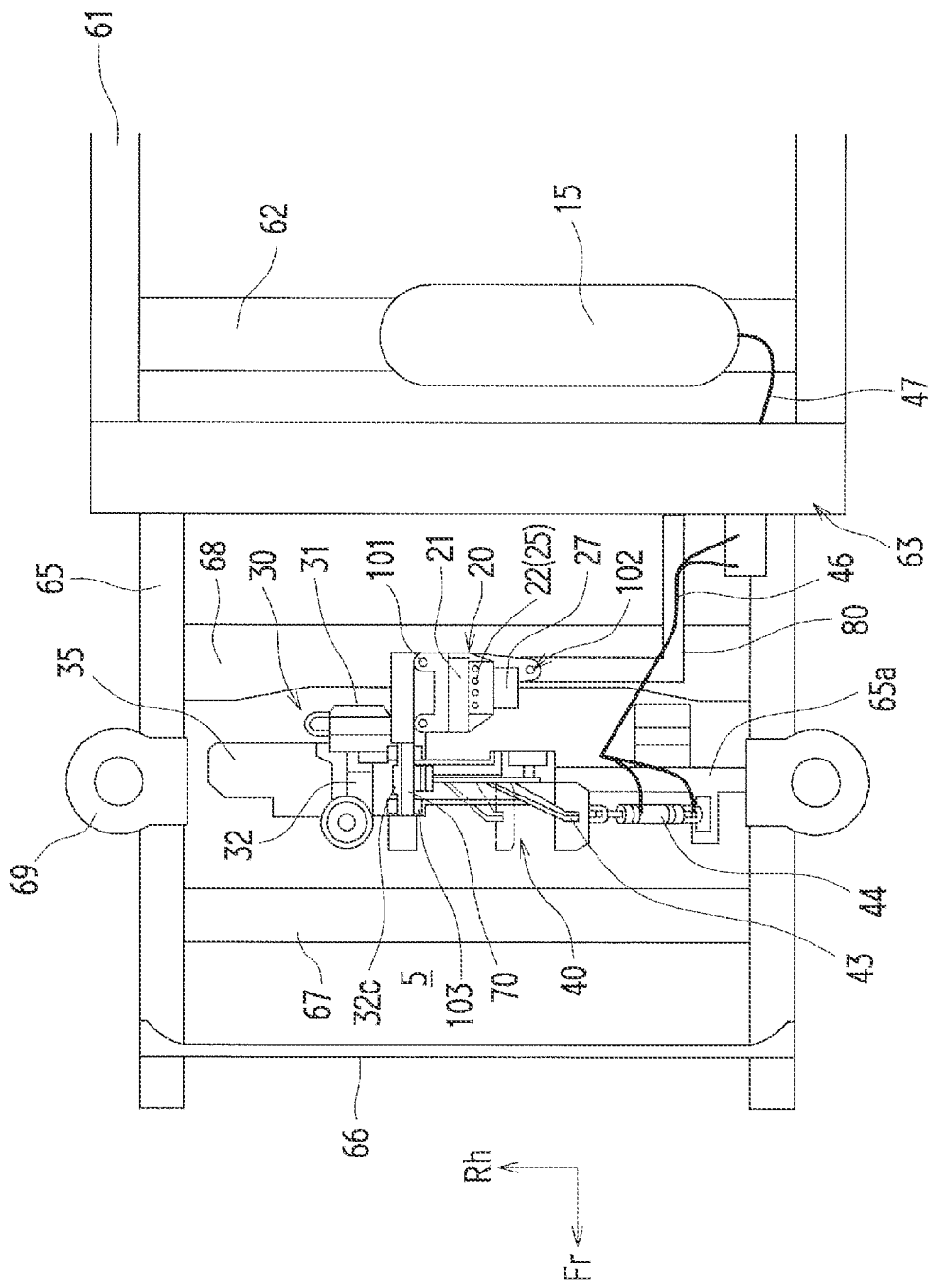
FIG. 9 is a plan view schematically illustrating the brake fluid pressure generation device mounted on the vehicle.

More specifically, as illustrated in FIG. 9, a pair of right and left side rails 65 is provided such that the right and left side rails 65 extend forward in the vehicle front-rear direction from both end portions, in the vehicle width direction, of the upper crossmember 63, respectively, and front end portions of the right and left side rails 65 are connected to each other via a crossmember 66. Further, a pair of front and rear crossmembers 67, 68 is provided so as to stretch over between the right and left side rails 65 such that the front and rear crossmembers 67, 68 extend in the vehicle width direction at a position below the side rails 65 and the crossmembers 63, 66. As illustrated in FIG. 10, each of the crossmembers 67, 68 extends in the vehicle width direction such that both end portions thereof extend to be inclined upwardly toward outer sides in the vehicle width direction and are attached to respective lower parts of the side rails 65. Note that a reference numeral 69 in FIGS. 9 and 10 indicates a suspension tower.

With such a configuration, the right and left sides of the front-side storage chamber 5 are defined by the right and left side rails 65, the front and rear sides of the front-side storage chamber 5 are defined by the crossmembers 63, 66, and the lower side of the front-side storage chamber 5 is defined by the crossmembers 67, 68.

As illustrated in FIGS. 6 and 7, in the brake unit 30, the reservoir tank 35 extending in the same direction as the cylinder housing 32 is provided above the cylinder housing 32 extending in a sliding direction of the first and second pistons 33, 34. Therefore, as the brake unit 30 as a whole, a length of the brake unit 30 in an extending direction (a longitudinal direction) of the cylinder housing 32 is longer than a length of the brake unit 30 in a direction (a direction perpendicular to the longitudinal direction) orthogonal to the extending direction of the cylinder housing 32 and a length of the brake unit 30 in the up-down direction. Note that the brake ECU 31 is provided on a side face of the cylinder housing 32.

As such, as illustrated in FIGS. 9 and 10, the brake unit 30 with the longitudinal direction being along the extending direction of the cylinder housing 32 (the sliding direction of the first and second pistons 33, 34) is arranged in an upper part of the front-side storage chamber 5 such that the longitudinal direction of the brake unit 30 is along a direction different from the vehicle front-rear direction in a plan view, that is, the longitudinal direction of the brake unit 30 is parallel to the vehicle width direction. More specifically, as illustrated in FIG. 11, a support bracket 67a extending in the vehicle front-rear direction is provided so as to stretch over between the two crossmembers 67, 68 arranged in the front-rear direction. As a flange portion 32c of the cylinder housing 32 is fastened by bolts 103 to an upper end portion of a first bracket 70 extending upward from the support bracket 67a, the brake unit 30 is arranged such that its longitudinal direction is along the vehicle width direction.

Further, as illustrated in FIGS. 6 and 9, the brake pedal unit 40 that shares the cylinder housing 32 with the brake unit 30 is arranged in the upper part of the front-side storage chamber 5 so as to be arrayed with the brake unit 30 in the vehicle width direction. More specifically, since the rod 42 connected to the input piston 41 housed in the cylinder housing 32 extending in the vehicle width direction extends in the vehicle width direction, the brake pedal 43 rotatably attached to a distal end portion of the rod 42 is also arrayed with the brake unit 30 in the vehicle width direction. Further, the air cylinder 44 configured to rotate the brake pedal 43 is fixed to a bracket 65a extending in the vehicle width direction from the side rail 65 such that the air cylinder 44 is arrayed with the brake unit 30 and the brake pedal 43 in the vehicle width direction. Note that the air tank 15 configured to supply the compressed air to the air cylinder 44 is arranged above the crossmember 62 provided behind the front-side storage chamber 5.

Hereby, in the present embodiment, as illustrated in FIGS. 6 and 9, the brake unit 30 and the brake pedal unit 40 extending in the vehicle width direction are arrayed generally linearly in the vehicle width direction.

In the brake actuator 20, as illustrated in FIGS. 6 and 7, the brake ECU 21, the actuator body portion 22 (including the reservoir tank 25), and a motor housing 27 in which the electric motor 26 is housed are provided so as to be arrayed in this order such that the brake ECU 21, the actuator body portion 22, and the motor housing 27 at least partially overlap each other in the vehicle front-rear direction when they are viewed from the vehicle width direction. Therefore, as the brake actuator 20 as a whole, a length of the brake actuator 20 in an array direction (also referred to as an arrangement direction) where those members are arrayed is longer than a length of the brake actuator 20 in a direction orthogonal to the arrangement direction and a length of the brake actuator 20 in the up-down direction.

As such, as illustrated in FIGS. 9 and 10, the brake actuator 20 formed so as to be long in the arrangement direction is arranged behind the brake pedal 43 in the vehicle front-rear direction (near the brake unit 30 and behind the brake unit 30 in the vehicle front-rear direction) in the upper part of the front-side storage chamber 5, such that the longitudinal direction (the arrangement direction) of the brake actuator 20 is parallel to the vehicle width direction.

In other words, the brake actuator 20 is arranged such that the brake actuator 20 and the brake unit 30 at least partially overlap each other in the vehicle front-rear direction when they are viewed from the vehicle width direction, as illustrated in FIG. 11. That is, the brake unit 30 is arranged such that the brake unit 30 is arrayed with the brake actuator 20 and the brake pedal unit 40 in the vehicle width direction.

More specifically, as illustrated in FIGS. 9 and 11, an L-shaped second bracket 80 is attached to the upper crossmember 63. The second bracket 80 is configured such that, after the second bracket 80 extends forward in the vehicle front-rear direction from a front end of the crossmember 63, the second bracket 80 is bent at a right angle and extends to the right side in the vehicle width direction. A distal end portion of the second bracket 80 and the upper end portion of the first bracket 70 are connected to an actuator bracket 90 via respective bolts 101, 102, and hereby, the first and second brackets 70, 80 are integrated with the actuator bracket 90. The brake actuator 20 is fastened to the actuator bracket 90 by bolts, and thus, the brake actuator 20 is arranged behind the brake pedal 43 in the vehicle front-rear direction such that the brake actuator 20 extends in the vehicle width direction.

Here, as illustrated in FIGS. 7 and 8, the brake actuator 20, the brake unit 30, and the brake pedal unit 40 are arranged at generally the same height in the upper part of the front-side storage chamber 5 such that the brake actuator 20, the brake unit 30, and the brake pedal unit 40 are adjacent to each other in the same horizontal plane. Note that the state where the brake actuator 20, the brake unit 30, and the brake pedal unit 40 are adjacent to each other "in the same horizontal plane" indicates a state where at least part of the brake actuator 20, at least part of the brake unit 30, and at least part of the brake pedal unit 40 are placed on the same horizontal plane. Further, generally, it is assumed that the brake pedal 43 is rotated by stepping force applied by a driver, and therefore, the brake pedal 43 is rotated below the rod 42. However, in the present embodiment, the brake pedal 43 is rotated by the air cylinder 44, so that the brake pedal 43 is rotated above the rod 42 as illustrated in FIGS. 7 and 8.

Hereby, as illustrated in FIG. 8, a relatively large space S is formed below the brake actuator 20 and the brake pedal unit 40 in the front-side storage chamber 5. On this account, in the present embodiment, an air conditioner unit 53 is arranged in the space S as illustrated in FIGS. 10 and 11.

Note that, in terms of correspondence between the specification and claims, the brake unit 30 corresponds to "a brake fluid pressure generation device including a cylinder and pistons configured to slide inside the cylinder, the brake fluid pressure generation device being configured to generate brake fluid pressure in accordance with strokes of the pistons" according to the present disclosure.

Further, it is preferable that the brake actuator 20, the brake unit 30, and the brake pedal unit 40 be arranged in the uppermost part in the front-side storage chamber 5, in other words, at the highest position among devices arranged inside the front-side storage chamber 5.

Operations and Effects

With the braking device 10 of the present embodiment configured as described above, since the brake unit 30 is arranged such that the sliding direction of the first and second pistons 33, 34 is parallel to the vehicle width direction, in other words, the longitudinal direction of the brake unit 30 is along the vehicle width direction, an axle, the crossmembers 63, 67, 68, and so on extending in the vehicle width direction can be arranged in parallel to the brake unit 30 inside the front-side storage chamber 5. Accordingly, in comparison with a case where the brake unit 30 is arranged so as to extend in the vehicle front-rear direction, in other words, a case where many devices and members extending in the vehicle width direction are provided together with the brake unit 30 extending in the vehicle front-rear direction, the front-side storage chamber 5 can be reduced in size, so that a space for the vehicle cabin 4 can be increased.

Further, as the brake pedal unit 40 configured to generate brake fluid pressure by causing the first and second pistons 33, 34 to stroke when the brake actuator 20 and the brake unit 30 are inoperable is arranged so as to be arrayed with the brake unit 30 in the vehicle width direction, it is possible to achieve fail safe and to reduce the size of the front-side storage chamber 5.

Besides, the brake pedal unit 40 is pneumatically actuated. Accordingly, even when the vehicle 1 has power outage, the vehicle 1 can be surely decelerated or stopped without requesting operations by a driver. Thus, it is not necessary to provide a brake pedal and its equivalent in the vehicle cabin 4, thereby making it possible to further increase the space for the vehicle cabin 4.

Further, the brake actuator 20 is arranged behind (inwardly from) the brake unit 30 in the vehicle front-rear direction. Accordingly, even when the brake unit 30 thus arranged in front of (outwardly from) the brake actuator 20 in the vehicle front-rear direction is damaged at the time of a vehicle collision, it is possible to lower the possibility of breakage of the brake actuator 20. Even when the brake unit 30 is damaged, it is possible to avoid malfunctions of the whole braking device 10 because the brake actuator 20 is provided on the downstream side from the brake unit 30 in the fluid pressure transmission route and generates the brake fluid pressure independently from the brake unit 30. Further, since the brake actuator 20 is arranged near the brake unit 30 in the front-side storage chamber 5, it is possible to shorten the first to fourth brake pipes 11, 12, 13, 14 and to maintain the front-side storage chamber 5 to be compact.

Further, the brake actuator 20, the brake unit 30, and the brake pedal unit 40 are arranged at generally the same height in the front-side storage chamber 5, and the air conditioner unit 53 is arranged in the space S formed below the brake actuator 20, the brake unit 30, and the brake pedal unit 40. In other words, the brake actuator 20, the brake unit 30, and the brake pedal unit 40 are arranged so as to be arrayed with the air conditioner unit 53 in the up-down direction. Accordingly, it is possible to further reduce the size of the front-side storage chamber 5.

The combination of the compactification of the front-side storage chamber 5 and the forming of the front-side and rear-side storage chambers 5, 7 so that the front-side and rear-side storage chambers 5, 7 partially overlap the vehicle cabin 4 in the vehicle front-rear direction can more surely increase the space for the vehicle cabin 4.

In addition, except that the air cylinder 44 is used instead of stepping force applied by a driver, the brake pedal unit 40 generates brake fluid pressure by causing the first and second pistons 33, 34 to stroke by use of the brake pedal 43, so that the same components used in a conventional brake fluid pressure generation device (a master cylinder) are also usable.

Other Embodiments

The present disclosure is not limited to the above embodiment and can be carried out in other various forms without departing from the spirit or main feature of the present disclosure.

In the above embodiment, the present disclosure is applied to a vehicle in which automated driving is enabled. However, the present disclosure is not limited to this and may be applied to a vehicle other than the vehicle in which automated driving is enabled, provided that the present disclosure is applied to a vehicle configured such that a brake operation part mechanically connected to a brake fluid pressure generation device arranged in a storage chamber is not provided in a vehicle cabin.

Further, in the above embodiment, the brake unit 30 is arranged in the front-side storage chamber 5 such that the longitudinal direction of the brake unit 30 is parallel to the vehicle width direction. However, the brake unit 30 is not limited to this, provided that the brake unit 30 is arranged such that the longitudinal direction of the brake unit 30 is along a direction different from the vehicle front-rear direction in a plan view. For example, the brake unit 30 may be arranged such that an angle formed between the sliding direction of the first and second pistons 33, 34 and the vehicle width direction is smaller than an angle formed between the sliding direction of the first and second pistons 33, 34 and the vehicle front-rear direction.

Further, in the above embodiment, three brake fluid pressure generation devices are provided in the braking device 10. However, the present disclosure is not limited to this, and one brake fluid pressure generation device may be provided, provided that the brake fluid pressure generation device generates brake fluid pressure in accordance with strokes of pistons sliding in a cylinder, and the brake fluid pressure generation device is arranged in a storage chamber such that a sliding direction of the pistons is along a direction different from the vehicle front-rear direction in a plan view.

In the above embodiment, the brake pedal unit 40 is pneumatically actuated. However, the present disclosure is not limited to this. For example, the brake pedal unit 40 may be hydraulically actuated, provided that the brake pedal unit 40 can generate brake fluid pressure by causing the first and second pistons 33, 34 to stroke when the brake unit 30 is inoperable. Further, the brake pedal unit 40 may be an electrically actuated device configured such that the brake pedal 43 is pushed by an electrical linear actuator.

Further, the above embodiment deals with (B-2) as a case where the brake pedal unit 40 is actuated. However, the present disclosure is not limited to this. For example, when the vehicle 1 is parked, the brake pedal unit 40 may be actuated as a parking brake.

Further, in the above embodiment, the reservoir tank 35 is provided above the cylinder housing 32, and the brake ECU 31 is provided on a side face of the cylinder housing 32. However, the present disclosure is not limited to this. For example, the cylinder housing 32, the reservoir tank 35, the electric motor 36, and the brake ECU 31 may be arranged so as to at least partially overlap each other in the vehicle front-rear direction when they are viewed from the vehicle width direction.

Thus, the above embodiment is just an example in every respect and must not be interpreted restrictively. Further, modifications and alterations belonging to an equivalent range of claims are all included in the present disclosure.

With the present disclosure, it is possible to increase a space for a vehicle cabin. Accordingly, the present disclosure is useful when the present disclosure is applied to a vehicle braking device provided in a vehicle configured such that a brake operation part mechanically connected to a brake fluid pressure generation device arranged in a storage chamber is not provided in a vehicle cabin.

What is claimed is:
1. A vehicle braking device comprising:
 a brake fluid pressure generation device arranged in a storage chamber separated from a vehicle cabin; and
 a brake operation part mechanically connected to the brake fluid pressure generation device, the brake operation part being not provided in the vehicle cabin, wherein:

the brake fluid pressure generation device includes a reserve tank, a cylinder and pistons configured to slide inside the cylinder, wherein the reserve tank is provided above the cylinder;

the brake fluid pressure generation device is configured to generate brake fluid pressure in accordance with strokes of the pistons;

the brake fluid pressure generation device is arranged such that a sliding direction of the pistons is along a direction different from a vehicle front-rear direction in a plan view; and the reserve tank is configured to extend in the same direction as an extending direction of the cylinder extending in the sliding direction of the pistons.

2. The vehicle braking device according to claim 1, wherein the brake fluid pressure generation device is arranged such that an angle formed between the sliding direction of the pistons and a vehicle width direction is smaller than an angle formed between the sliding direction of the pistons and the vehicle front-rear direction in a plan view.

3. The vehicle braking device according to claim 1, wherein the brake fluid pressure generation device is arranged such that the sliding direction of the pistons is parallel to a vehicle width direction.

4. The vehicle braking device according to claim 1, wherein the storage chamber includes a pushing member configured to cause the pistons to stroke by pushing the pistons.

5. The vehicle braking device according to claim 1, wherein the vehicle is a vehicle in which automated driving is enabled.

6. A vehicle braking device comprising:

a brake fluid pressure generation device arranged in a storage chamber separated from a vehicle cabin; and a brake operation part mechanically connected to the brake fluid pressure generation device, the brake operation part being not provided in the vehicle cabin, wherein:

the brake fluid pressure generation device includes a first brake fluid pressure generation device including a first fluid pressure source, and a second brake fluid pressure generation device including a second fluid pressure source; and the first brake fluid pressure generation device and the second brake fluid pressure generation device are arranged so as to at least partially overlap each other in a vehicle front-rear direction when the first brake fluid pressure generation device and the second brake fluid pressure generation device are viewed from a vehicle width direction, wherein the first brake fluid pressure generation device includes at least one of a reserve tank and a brake electronic control unit, and wherein the second brake fluid pressure generation device includes at least one of a reserve tank and a brake electronic control unit.

7. The vehicle braking device according to claim 6, wherein the vehicle is a vehicle in which automated driving is enabled.

8. A vehicle braking device comprising:

a brake fluid pressure generation device arranged in a storage chamber separated from a vehicle cabin; and a brake operation part mechanically connected to the brake fluid pressure generation device, the brake operation part being not provided in the vehicle cabin, wherein:

the brake fluid pressure generation device includes a reserve tank, a fluid pressure source, and a brake electronic control unit;

the reserve tank, the fluid pressure source, and the brake electronic control unit are arranged in an upper part of the storage chamber so as to at least partially overlap each other in a vehicle front-rear direction when the reserve tank, the fluid pressure source, and the brake electronic control unit are viewed from a vehicle width direction, the brake fluid pressure generation device includes a cylinder and pistons configured to slide inside the cylinder in the vehicle width direction; and the reserve tank is configured to extend in the same direction as an extending direction of the cylinder extending in the sliding direction of the pistons.

9. The vehicle braking device according to claim 8, wherein:

the cylinder, the reserve tank, the fluid pressure source, and the brake electronic control unit are arranged in the upper part of the storage chamber so as to at least partially overlap each other in the vehicle front-rear direction when the cylinder, the reserve tank, the fluid pressure source, and the brake electronic control unit are viewed from the vehicle width direction.

10. The vehicle braking device according to claim 8, wherein the vehicle is a vehicle in which automated driving is enabled.

11. A vehicle braking device comprising:

a brake fluid pressure generation device arranged in a storage chamber separated from a vehicle cabin; and a brake operation part mechanically connected to the brake fluid pressure generation device, the brake operation part being not provided in the vehicle cabin, wherein:

the brake fluid pressure generation device includes a first brake fluid pressure generation device including a first fluid pressure source, and a second brake fluid pressure generation device including a second fluid pressure source; and the first brake fluid pressure generation device and the second brake fluid pressure generation device are arranged in an upper part of the storage chamber so as to be adjacent to each other in the same horizontal plane, wherein the first brake fluid pressure generation device includes at least one of a reserve tank and a brake electronic control unit, and wherein the second brake fluid pressure generation device includes at least one of a reserve tank and a brake electronic control unit.

12. The vehicle braking device according to claim 11, wherein the vehicle is a vehicle in which automated driving is enabled.

13. The vehicle braking device according to claim 1, wherein the brake operation part is operated by a foot of an occupant.

14. The vehicle braking device according to claim 11, wherein at least one of the first brake fluid pressure generation device and the second brake fluid pressure generation device includes the reserve tank.

* * * * *